T. Williams,

Treadle.

No. 1,414. Reissued Feb. 17, 1863.

Witnesses.
Edwd. A. Osborne
Isaac A. Bonnell.

Inventor
Turner Williams

UNITED STATES PATENT OFFICE.

TURNER WILLIAMS, OF PROVIDENCE, RHODE ISLAND, ASSIGNOR TO HIMSELF AND DAVID HEATON, 2D.

IMPROVEMENT IN MODE OF CONVERTING RECIPROCATING INTO ROTARY MOTION.

Specification forming part of Letters Patent No. 31,649, dated March 5, 1861; Reissue No. 1,414, dated February 17, 1863.

*To all whom it may concern:*

Be it known that I, TURNER WILLIAMS, of Providence, in the county of Providence and State of Rhode Island, have invented a new and useful improvement in the devices for converting a reciprocating motion into a continuous rotary motion; and I do hereby declare that the following is a full, clear, and exact description of the same, reference being had to the accompanying drawings, making part of this specification, in which—

Figure 1:
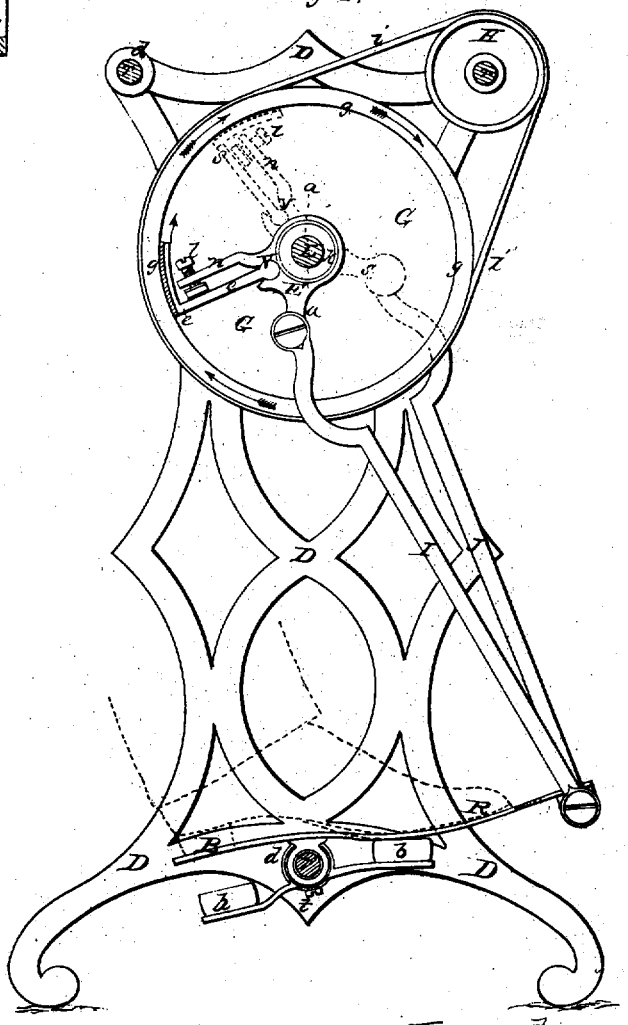

Figure 1 is an elevation of my improved device complete. Figs. 2, 3, 4, 5, and 6 are details of the same, which are referred to as the description proceeds.

Similar letters of reference indicate corresponding parts in all the figures.

My invention is a substitute for and is designed to supersede the well-known crank for converting the reciprocating motion of a treadle or other device used into the continuous rotary motion of a shaft or wheel, in order to overcome certain inherent objections which disqualify the crank for operating certain kinds of machinery successfully. In sewing-machines, for exampe, the crank is liable to turn the driving-shaft in the wrong direction, and by so doing reverse the motions and working of the machine, which is injurious to the machine and deranges the work. The crank is also liable to stop on a "dead-center" or extreme point of its stroke, in which position it cannot be started by the treadle alone and unassisted. The motion of the crank is unequal in passing from one end of its stroke to the other, in consequence of which it is extremely difficult to operate the machine slowly yet positively, which movement is absolutely necessary in performing many kinds of work.

To obviate these and other objections in the crank, and to produce a continuous rotation of a shaft or wheel in one direction only, which shall be very slow yet positive, or as rapid as can be produced by a crank, is the object of my invention, which consists, first, in the use of two rocking disk-plates or arms, arranged with two fixed circular flanges upon the shaft to be revolved; second, in the use of two friction pawls or their equivalent for binding the disk-plates to the circular flanges at the proper time by the rocking movement of the said disk-plates, and otherwise operating substantially as herein described; third, in the use of a pair of curved connecting-rods for rocking the two disk-plates in opposite directions simultaneously with the greatest range of motion by the reciprocating motion of a treadle or other device used, substantially as hereinafter specified; fourth, in the use of a spring-buffer or the equivalent thereof for limiting the movement of the pawls to prevent their remaining on a dead-center, substantially as hereinafter specified.

To enable others who are familiar with machines of this character to ascertain the nature and extent of my invention, as well as to make use of the same, I will proceed to describe its arrangement and operation.

Figure 3:
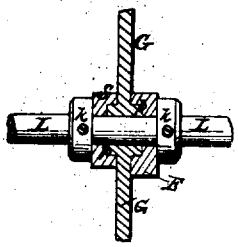
Figure 2:
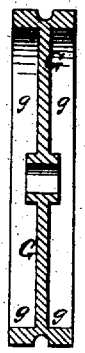
Figure 4:
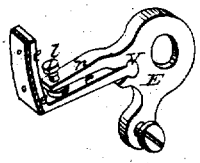
Figure 5:
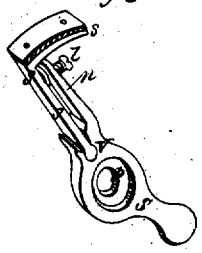

In the annexed drawings, E and S, Figs. 1, 4, and 5, are two disk-plates fitted to turn easily upon the shaft L, and *g g* are two flanges forming part of the wheel G, which is secured by its hub to the said shaft, the said disk-plates and flanges being arranged relatively each to the other, as shown in Figs. 1 and 3, each disk-plate being formed with a circular recess, *p*, Figs. 3 and 5, for the reception of the hub of the flanged wheel in order that the disk-plates may operate directly beneath the flanges *g g* and close to the plate G of the wheel, in which position they are held by the fixed collars *k k* on the shaft. Between each disk-plate and its flange I interpose a friction-pawl, *e* and *s*, Figs. 1, 4, and 5, whose office is to bind the disk-plate with its flange when the disk-plate is turned in one direction upon the shaft, and to release and disconnect the disk-plate from its flange when moved in an opposite direction.

The friction-pawls, as represented, consist of a straight shank, having a bearing at V in the disk-plate and a foot-piece extending at right angles from such shank which bears against the inner surface of the flange *g*, Fig. 1, and is shod with leather to create friction in the (latter) bearing, in order that the binding action may be instantaneous and forcible, which is absolutely necessary in this connection and which the peculiar construction of the pawls is eminently calculated to effect.

The distinctive peculiarities of arrangement and mode of operation of the said friction-pawls are as follows: It will be seen that the pawl *e*, for example, Fig. 1, has an axis at V in the disk-plate independently of the axis of the disk-plate; that turning upon its said axis V the foot-piece describes an inclined curve, as indicated by the dotted red lines with respect to the curve of the flange, *g*, and irregular with the axis of the disk-plate; that the said inclined curve cuts the curve of the flange *g* and describes a curve outside and beyond the limits of said curve *g*; that in consequence of this independent movement of the pawl on its own axis, V, its natural tendency is to move in a space outside and beyond that to which it is limited by the flange *g*, and that, being arrested and confined in its efforts to do so by the flange *g*, the result is that the foot-piece of the pawl is pressed forcibly against the flange, in doing which it binds the disk-plate E to the flange *g*, which effect is produced by turning the disk-plate in a given direction on the shaft, and in order to control the action of the pawl when the disk-plate is turned in an opposite direction to that necessary for producing the binding action for the purpose of liberating the pawl and effecting a disconnection between the disk-plate and the flange *g*, I make use of a finger or stop, *n*, projecting from the disk-plate, in which a set-screw, V, or in lieu thereof a spiral spring or a projecting piece of india-rubber, is inserted, which by contact with the pawl determines the movement of the same in one direction and serves to trip the pawl and carry it with the disk-plate in the opposite direction. Thus, if the disk-plate E, Fig. 1, be turned upon the shaft L in the direction indicated by the arrows, the set-screw or its substitute will be freed from contact with or its firmer pressure upon or against the pawl, as shown, and the pawl, being free to turn on its own axis, will instantly bind and connect the disk-plate with the flange *g*, and if the motion of the disk-plate be continued a rotary motion will be imparted to the wheel G and the shaft L, and, if then the disk-plate be turned in the opposite direction to that indicated by the arrows, the binding action will be instantly destroyed, the disconnection of the disk-plate and its flange will be effected, and the set-screw *l* or its substitute by contact or a pressure with the pawl *e* will carry it with the disk-plate if the movement be continued until it arrives at the point (relatively) from whence it first started. This finger or projection on the disk-plate, with an adjusting device—as a screw or spring—is essential for properly controlling the action of the pawl, and in combination therewith forms one feature of improvement in my invention. The said pawls, it should be understood, are susceptible of considerable modification without changing their nature or mode of operation.

The pawl may consist of a roller or a ball interposed between the flange *g* and a curved incline surface on the disk-plate, in which case the point of contact with the curved incline surface is the "independent axis" of the pawl. The pawl has a curved incline movement with respect to the flange *g*, the binding action is produced in precisely the same manner with the same effect, and the action of such pawl is of necessity controlled by a projection and adjusting device upon the disk-plate, in all respects equivalent to the projecting finger *n* and set-screw *l*, above described and fully shown in Figs. 1, 4, and 5 of the annexed drawings. The pawl may also consist of a semicircular piece of metal or half-disk, interposed between the flange *g* and a curved incline or irregular surface, as shown and described by drawings and accompanying description on file in the United States Patent Office with the original papers of my application for Letters Patent No. 2,723, granted November 12, 1861, for "an improvement in cranks," &c. The pawl may also consist of an eccentric arranged and operating substantially as shown and described in Letters Patent No. 36,263, granted to me, the said TURNER WILLIAMS, and DAVID HEATON, 2d, assignees, August 19, 1862, the distinctive features of said pawl as above described being visible in each case. The pawls are worked in opposite directions simultaneously by means of a pair of connecting-rods, I and J, the upper extremity of the rod I being pivoted by a wrist-pin to the disk-plate E, and the upper extremity of the rod J being pivoted in like manner to the disk-plate S, the lower extremity of the two rods being united in a common swinging joint with the treadle R. The upper extremities of the said connecting-rods I and J are formed with a curve, so as to embrace the shaft, and thereby work the pawls with a greater range of motion than could be obtained if these connecting-rods were straight.

Figure 6:
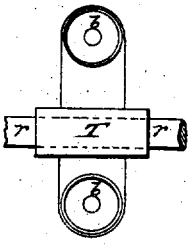

In order to prevent the two pawls from remaining on a dead-center or extreme point of the stroke, I make use of a spring-buffer, *b b*, Figs. 1 and 6, arranged upon two projecting pieces, which are firmly secured to the rod *r'*, upon which the treadle vibrates, and beneath the treadle by a set-screw, *t*, as shown. The stroke or throw of the treadle is arrested by coming in contact with the spring-buffer *b* as the upper extremity of the rods approach the dead-centers, and the rebound resulting from such contact assists the foot in changing the stroke of the treadle.

It will be seen that in using a spring-buffer to arrest the throw of the treadle and thereby prevent the pawls from stopping on a dead-center such buffers may be arranged in a number of ways and the same result produced—viz., two collars of india-rubber may be arranged upon the shaft L, so that that part of the rods I and J which embraces the shaft will by contact with such collars arrest the movement of the pawls, or the buffer may be arranged between the rods, and by preventing the rods from coming together arrest and limit the throw of the pawls; but though these modifications of arrangement may be employed, I prefer the arrangement first described and shown in the annexed drawings as being best calculated to arrest the movement at the point where the propelling force is exerted, and thereby relieve the working parts from the sudden strain and jerk consequent upon the sudden arresting of motion, which contributes greatly to derange and weaken the machine. As represented, the flanged wheel G is calculated for a driving-wheel, it being formed with a suitable groove for a round belt and with a flat face for a flat belt, by means of which motion and power may be transmitted to other machinery.

In the form presented the machine is arranged for driving sewing machines, the operation of which is as follows: The foot of the operator is applied to the treadle in the position shown by dotted lines Fig. 1, and a rocking motion is produced by pressing down alternately with the heel and toe of the foot, which imparts a reciprocating movement to the forepart of the treadle, to which the rods I and J are attached. If in the position shown in Fig. 1 the rear end of the treadle be pressed downward the forward end is raised, and the upward throw is communicated through the rods I and J to the disk-plates E and S, turning said disk-plates on the shaft L in opposite directions, as indicated by the arrows. This opposite movement produces an opposite effect in the two pawls *e* and *s*, producing in *e* the instantaneous binding action before described with the flange *g* of the wheel to which it communicates the motion received from the treadle, causing the wheel to turn in the direction indicated by the arrows. At the same time the opposite movement of the disk-plate S destroys the binding action in the pawl *s* and frees the foot-piece from close contact with the flange *g*, and it returns to attach itself by the binding action in a position in the rear of and near the point from which pawl *e* first started, which attachment takes place instantly upon the change of motion of the two disk-plates, produced by the downward stroke of the treadle, which next follows, when pawl S takes up and continues the rotary movement of the wheel, at the same time pawl *e* retreats preparatory to transmitting a successive movement to the wheel in its turn. In this alternate propelling action of the two friction-pawls no perceptible variation from a continuous rotary motion is seen, the wheel revolving steadily in one direction only, which direction may be reversed by exchanging the disk-plates upon the wheel or by substituting other pawls designed to operate in opposite directions. Thus it will be seen that the reciprocating motion of the treadle R is converted by means of the curved connecting-rods I and J, the disk-plates E and S, and the friction-pawls *e* and *s* into the rotary motion of the wheel G and shaft L. This mechanism is peculiarly adapted to driving sewing-machines, as a steady rotation of the wheel or shaft may be produced with but a slight movement of the treadle, and by working the treadle with its greatest range of motion a rate of speed fully equal to that from the crank may be obtained, and as the wheel is rotated in one direction only, all derangement of the sewing parts is avoided which results from turning the driving-wheel in the opposite direction from that intended. Again, as the force exerted upon the treadle is transmitted directly to the point from which it is imparted to the machine driven, the best effort of the operator is transmitted in power to the machine, at the same time the driving-wheel is wholly under the control of the operator to produce a very slow positive revolution, which is often desirable in adjusting and regulating the working of sewing-machines and in correcting any accidental derangement which may happen. Finally, this mechanism places the positive revolutions in one direction of a driving-wheel in whatever capacity it may be employed wholly under the control of the operator.

Having thus described my invention, I wish it understood that I do not confine myself to the particular construction and arrangement of the parts as described specifically that I do not restrict myself to the use of the friction-pawls when applied to and binding with the flanges of the driving-wheel proper; but I claim any and all applications of such pawls for binding an oscillating disk-plate, or its equivalent, to a fixed circular flange upon a shaft for the purpose of propelling such shaft by a continuation of the movement which produces such binding effect, substantially as herein specified, whether such flange forms a part of the driving-wheel or not. Neither do I restrict myself to the particular construction of the friction-pawls as described and shown, but I claim any and all constructions thereof embodying the essential features and operating substantially as and with the same effect as herein specified, be they in the form of rollers, balls, half-disks, eccentrics, or any other substantially the equivalent of the friction-pawls or more or less effective.

What I claim as my invention, and desire to secure by Letters Patent, is—

1. The combination of two rocking disk-plates or their equivalent with two fixed circular flanges upon a shaft to be rotated, substantially as herein specified.

2. The use of two friction-pawls or their equivalent for binding the said disk-plates with the circular flanges at the proper time by the rocking movement of the disk-plates, and otherwise operating substantially as herein specified, and, in combination with such friction-pawls, a projection, *n*, and set-screw *l* upon the disk-plate or their equivalent, for controlling the action of such friction-pawls, substantially as herein specified.

3. The combination of the pair of curved connecting-rods I J and the two disk-plates E S or their equivalent, substantially as described, for the purpose specified.

4. The use of a spring-buffer or its equivalent for arresting and limiting the movement of the two friction-pawls, substantially as and to effect the purpose herein specified.

TURNER WILLIAMS.

Witnesses:

ISAAC A. BROWNELL,
D. K. HOXSIE.